(12) United States Patent
Fujiki et al.

(10) Patent No.: US 10,106,163 B2
(45) Date of Patent: Oct. 23, 2018

(54) MERGING ASSISTANCE DEVICE AND MERGING ASSISTANCE METHOD

(71) Applicant: DENSO CORPORATION, Kariya, Aichi-pref. (JP)

(72) Inventors: Koji Fujiki, Kariya (JP); Hiroaki Niino, Kariya (JP); Shotaro Fukuda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 98 days.

(21) Appl. No.: 15/407,132

(22) Filed: Jan. 16, 2017

(65) Prior Publication Data
US 2017/0203764 A1    Jul. 20, 2017

(30) Foreign Application Priority Data

Jan. 14, 2016   (JP) .................. 2016-005159

(51) Int. Cl.
| | |
|---|---|
| B60W 10/04 | (2006.01) |
| B60W 30/18 | (2012.01) |
| B60W 10/20 | (2006.01) |
| B60W 10/18 | (2012.01) |
| B60W 30/16 | (2012.01) |
| B60W 40/04 | (2006.01) |

(52) U.S. Cl.
CPC ...... *B60W 30/18163* (2013.01); *B60W 10/04* (2013.01); *B60W 10/18* (2013.01); *B60W 10/20* (2013.01); *B60W 30/16* (2013.01); *B60W 40/04* (2013.01); *B60W 2550/408* (2013.01)

(58) Field of Classification Search
CPC ...... B60W 10/04; B60W 10/18; B60W 10/20; B60W 30/16; B60W 40/04; B60W 2550/408
See application file for complete search history.

(56) References Cited

U.S. PATENT DOCUMENTS

| | | | |
|---|---|---|---|
| 2015/0100216 A1* | 4/2015 | Rayes | B60W 30/143 701/96 |
| 2015/0210274 A1* | 7/2015 | Clarke | B60W 30/00 382/104 |

FOREIGN PATENT DOCUMENTS

JP      H10-105239 A     4/1998

OTHER PUBLICATIONS

"How to Merge Onto the Highway Without Crashing", published Dec. 2013, retreived via Wayback Machine at https://web.archive.org/web/20131231214331/https://www.wikihow.com/Merge-Onto-the-Highway-Without-Crashing (Year: 2013).*

* cited by examiner

*Primary Examiner* — Calvin Cheung
(74) *Attorney, Agent, or Firm* — Knobbe, Martens, Olson & Bear, LLP

(57) ABSTRACT

In assisting merging vehicles on the road, a own vehicle is accelerated to target speed on a first lane. The own vehicle accelerated to the target speed is caused to change a travel lane from the first lane into a second lane. A distance A from the own vehicle to a reference position is acquired in the first lane, and speed of the own vehicle is also acquired. A traveling distance B required for the own vehicle to stop is calculated under a condition where the own vehicle traveling at speed acquired starts to slow down at predetermined deceleration. Assisting in merging is performed, on condition that a value obtained by subtracting the calculated distance B from the acquired distance A is smaller than a predetermined threshold value during a period from a start time of the acceleration to a start time of changing the travel lane.

14 Claims, 8 Drawing Sheets

MERGING ASSISTANCE DEVICE AND MERGING ASSISTANCE METHOD

CROSS-REFERENCE TO RELATED APPLICATION

This application is based on and claims the benefit of priority from earlier Japanese Patent Application No. 2016-005159 filed on Jan. 14, 2016, the description of which is incorporated herein by reference.

TECHNICAL FIELD

The present invention generally relates to a merging assistance device and a merging assistance method for vehicle on the road.

BACKGROUND

In Japanese Unexamined Patent Application Publication No. H10-105239, a vehicle driving control system configured to control a vehicle when this vehicle merges from one travel lane (i.e., its current travel lane or a merge lane) into another travelling lane (hereinafter, referred to as a merging target lane) is disclosed. In the following description, a vehicle merging from one travel lane into a merging target lane is referred to as a merging vehicle.

This type of vehicle driving control system recognizes a position and a traveling condition of each of a merging vehicle (i.e., the own vehicle) and another vehicle. Then, on the basis of this recognition result, the vehicle driving control system controls the traveling condition of the merging vehicle such that the merging vehicle can merge from the current travel lane into the merging target lane without contacting another vehicle.

Depending on a peripheral situation at the beginning phase, a vehicle driving control system installed in a merging vehicle determines that this merging vehicle can merge from one travel lane into the merging target lane at the beginning phase and starts driving control of this merging vehicle. However, it becomes difficult for such a merging vehicle to merge into the merging target lane due to change in its peripheral situation after starting the driving control in some cases. Even in such cases, it is required to safely control the merging vehicle.

SUMMARY

It is thus desired to provide a merging assistance device capable of securing safety of a vehicle in a case where it becomes difficult for a vehicle to merge after control of assisting in a merging operation is started.

A merging assistance device according to an exemplary embodiment is configured to assist the own vehicle traveling on the first lane in merging into the second lane. The merging assistance device includes an accelerator and a lane-change controller. The accelerator accelerates the own vehicle to a target speed in the first lane. The lane-change controller causes the own vehicle accelerated to the target speed to change its travel lane from the first lane into the second lane.

The merging assistance device further includes a distance-A acquisition unit, an own-vehicle speed acquisition unit, a traveling-distance-B calculator, and a stop controller. The distance-A acquisition unit acquires a distance A from the own vehicle to a reference position in the first lane. The own-vehicle speed acquisition unit acquires speed of the own vehicle. The traveling-distance-B calculator calculates a traveling distance B required for the own vehicle to stop under a condition where the own vehicle traveling at the speed acquired by the own-vehicle speed acquisition unit starts to slow down at predetermined deceleration. The stop controller stops an operation of assisting in merging, on condition that a value obtained by subtracting the distance B from the distance A is smaller than a predetermined threshold value during a period from a start time of acceleration controlled by the accelerator to a start time of changing a travel lane controlled by the lane-change controller.

Even if the own vehicle is put into a situation where the own vehicle should not merge into a merging target lane due to some unspecified reasons after starting acceleration for merging, the merging assistance device can stop assistance in merging before the own vehicle gets excessively close to the reference point of merging. As a result, safety of the own vehicle can be enhanced.

Each of the reference signs in parentheses in this summary and claims indicates its corresponding component in the embodiments described below, and this is only one of possible interpretations. Thus, those reference signs in parentheses should not be interpreted as limitation of the technical scope.

DETAILED DESCRIPTIONS OF PREFERRED EMBODIMENTS

Hereinafter, embodiments of the present disclosure will be described with reference to the accompanying drawings.

<First Embodiment>
<Configuration of Merging Assistance Device>
Configuration of the merging assistance device 1 will be described with reference to FIG. 1 and FIG. 2. The merging assistance device 1 is an in-vehicle device to be installed in a vehicle. Hereinafter, a vehicle in which the merging assistance device 1 is installed is referred to as the own vehicle.

Figure 1:
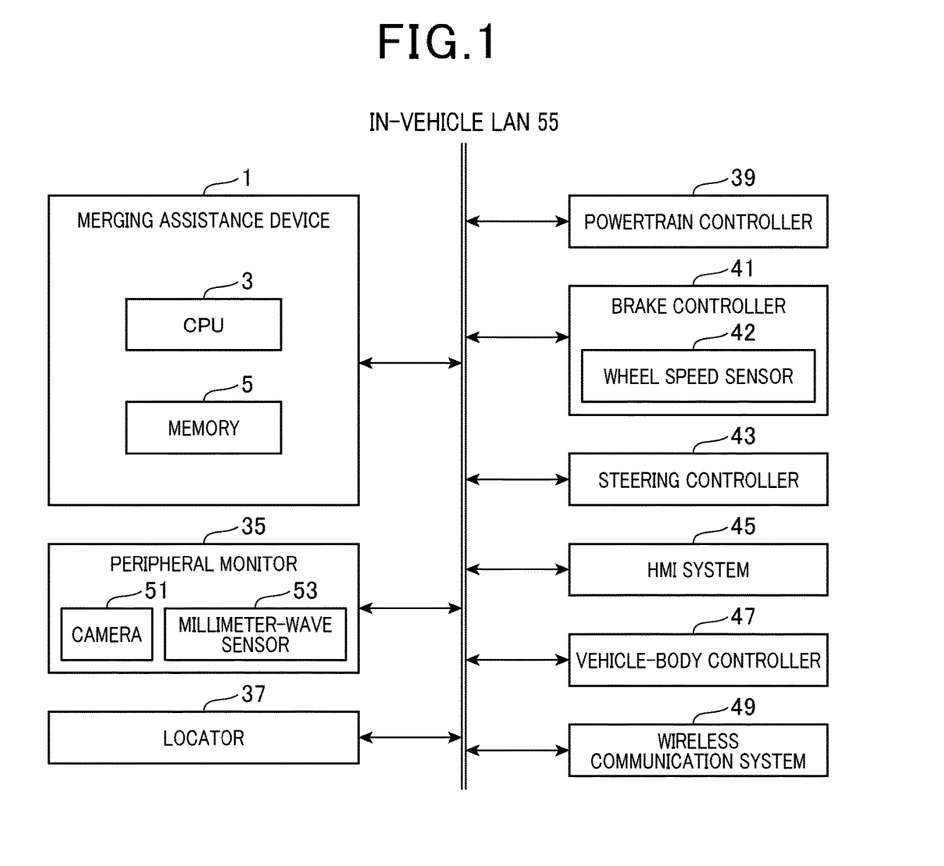
FIG. 1 is a block diagram illustrating the merging assistance device 1 and configuration relevant to the merging assistance device.

The merging assistance device 1 principally includes, as shown in FIG. 1, a known microcomputer equipped with a central processing unit (CPU) 3 and a semiconductor memory (hereinafter, referred to as a memory 5) such as a random access memory (RAM), a read-only memory (ROM), and/or a flash memory. Note that the number of microcomputers included in the merging assistance device 1 is not limited to one but may be plural. The CPU 3 implements various functions of the merging assistance device 1 by executing predetermined programs stored in a non-transitory computer readable recording medium. In this case, the memory 5 corresponds to the non-transitory computer readable recording medium storing therein those predetermined programs. Additionally, execution of each of the predetermined programs realizes the method corresponding to each of the predetermined programs. The merging assistance device 1 can be provided by using one or more microcomputers, not limited to using the single microcomputer.

Figure 2:
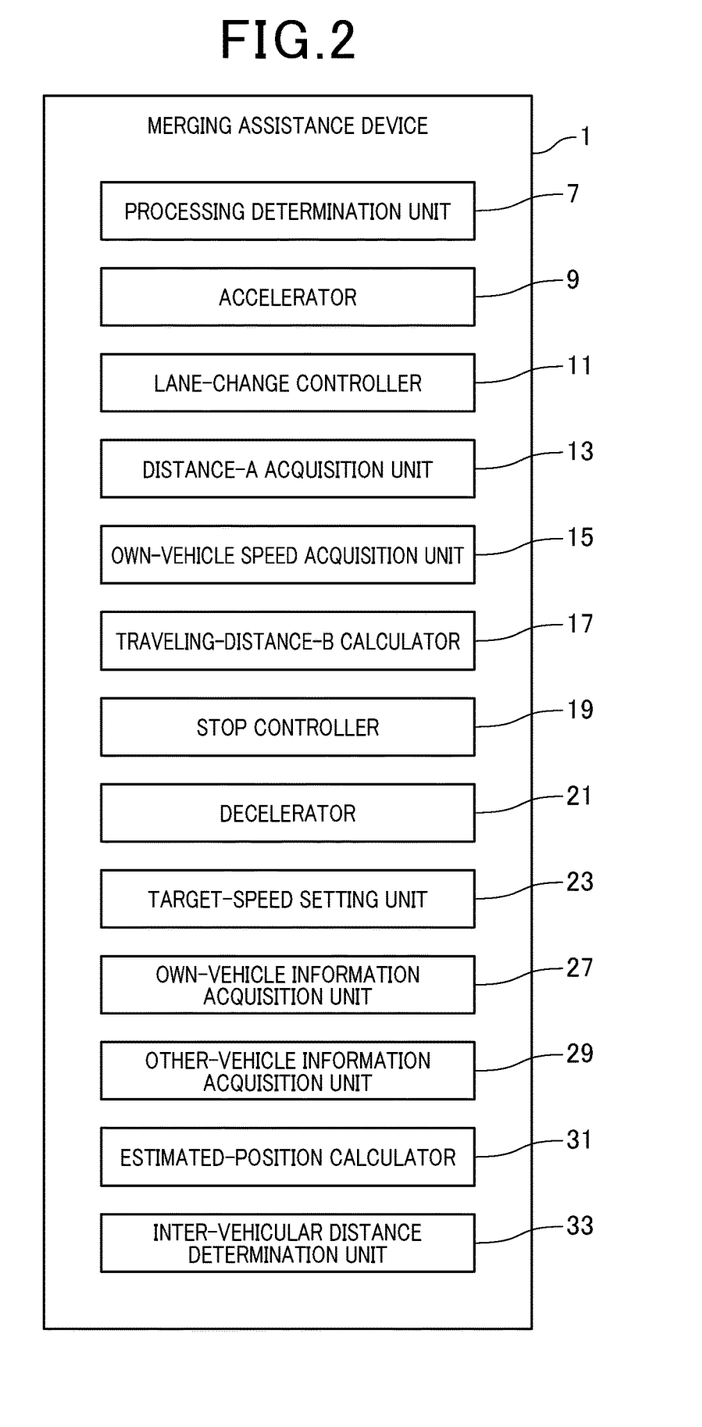
FIG. 2 is a block diagram illustrating functional configuration of the merging assistance device.

FIG. 2 shows respective functional components of the merging assistance device 1 to be implemented by the CPU 3 when the CPU 3 executes the predetermined programs. That is, a processing determination unit 7, an accelerator 9, a lane-change controller 11, a distance-A acquisition unit 13, an own-vehicle speed acquisition unit 15, a traveling-distance-B calculator 17, a stop controller 19, a decelerator 21, a target-speed setting unit 23, an own-vehicle information acquisition unit 27, an other-vehicle information acquisition unit 29, an estimated-position calculator 31, and an inter-vehicular distance determination unit 33 are included as functional components of the merging assistance device 1.

A method of implementing those functional components constituting the merging assistance device 1 is not limited to software. Some or all of those functional components may be implemented by hardware in which various types of circuits such as logic circuits and analog circuits are combined with each other. Incidentally, the other-vehicle information acquisition unit 29 corresponds to the other-vehicle information acquisition unit and the other-vehicle speed acquisition unit.

Returning to FIG. 1, the own vehicle includes a peripheral monitor 35, a locator 37, a powertrain controller 39, a brake controller 41, a steering controller 43, a human-machine interface (HMI) system 45, a vehicle-body controller 47, and a wireless communication system 49 in addition to the merging assistance device 1.

The peripheral monitor 35 is equipped with known sensors such as a camera 51 and a millimeter-wave sensor 53. Those sensors of the peripheral monitor 35 including the camera 51 and the millimeter-wave sensor 53 can detect the position and speed of another vehicle. The peripheral monitor 35 transmits detection results of those sensors to the merging assistance device 1.

The locator 37 is equipped with a global positioning system (GPS) and a memory device in which map information is stored. The map information includes positional information of respective traffic components such as the merging section 71 and the reference position 69 described below in addition to normal geographic map information. The locator 37 has a function of acquiring positional information of the own vehicle. The locator 37 transmits the positional information of the own vehicle to the merging assistance device 1.

The powertrain controller 39 has a function of controlling powertrain of the own vehicle.

The brake controller 41 has a function of performing a brake operation of the own vehicle. Additionally, the brake controller 41 is equipped with a wheel speed sensor 42. The wheel speed sensor 42 detects rotational speed of the wheels of the own vehicle as a signal. The brake controller 41 transmits the detected signal of the wheel speed sensor 42 to the merging assistance device 1.

The steering controller 43 has a function of steering the own vehicle.

The HMI system 45 receives an operation from a driver of the own vehicle. Additionally, the HMI system 45 notifies the driver of the own vehicle of various types of information on the own vehicle.

The vehicle-body controller 47 has a function of performing various control operations of the own vehicle such as door-lock control, light control, lighting control of a blinker, and notification of a blinker state.

The wireless communication system 49 has a function of performing vehicle-to-vehicle communication and communication with traffic infrastructure such as a tollgate and a traffic light machine.

The merging assistance device 1, the peripheral monitor 35, the locator 37, the powertrain controller 39, the brake controller 41, the steering controller 43, the HMI system 45, the vehicle-body controller 47, and the wireless communication system 49 (hereinafter, collectively referred to as respective components) are interconnected via a wireless LAN 55. The respective components can transmit and receive various types of data and information via the wireless LAN 55.

<Operation Performed by Merging Assistance Device>

The merging assistance device 1 performs an operation of assisting the own vehicle in merging into a merging target lane from a merge lane (hereinafter, referred to as a merging assistance operation). Merging means, e.g., that the own vehicle 57 changes its travel lane from the merge lane (i.e., the current travel lane) 59 into the merging target lane (i.e., main lane) 61 as shown in (A), (B) and (C) of FIG. 5. The merge lane 59 is an example of the first lane, and the merging target lane 61 is an example of the second lane.

Figure 5:
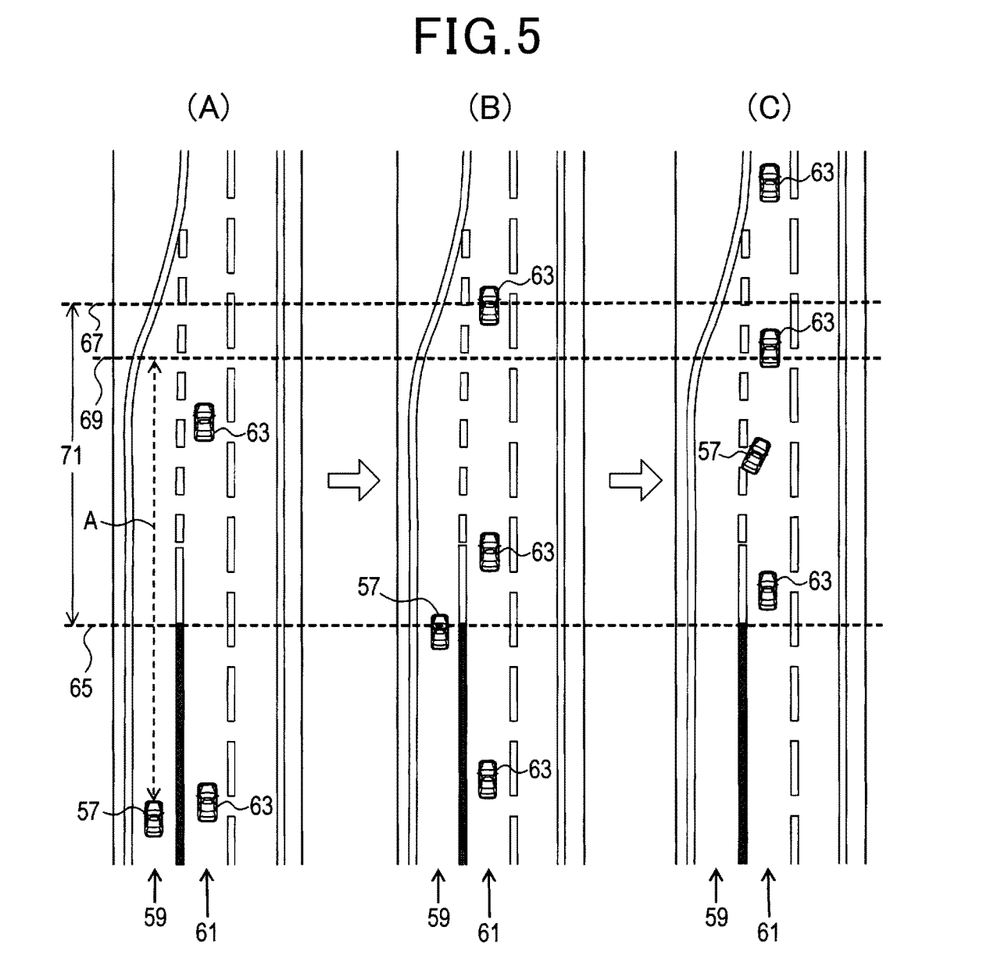
FIG. 5 shows in its (A), (B) and (C), a schematic arrangement diagram illustrating a merge lane (i.e., acceleration lane), a merging target lane, a merging-section starting point, a merging-section ending point, a reference position, and a merging section.

In FIG. 5, the reference sign 63 indicates another vehicle which is traveling on the merging target lane 61, and the reference sign 65 indicates a merging-section starting point. The merging-section starting point 65 is such a border point on the merge lane 59 that lane change from the merge lane 59 into the merging target lane 61 is physically possible and legally allowed on the region of the merge lane 59 beyond this border point.

In FIG. 5, the reference sign 67 indicates a merging-section ending point. The merging-section ending point 67 is such a termination point on the merge lane 59 that lane change from the merge lane 59 into the merging target lane 61 is physically impossible or legally prohibited on the region of the merge lane 59 beyond this termination point. Additionally or alternatively, the merging-section ending point 67 may be such a termination point that the region of the merge lane 59 beyond this termination point is narrowed in width and inapt for continuation of traveling. The section from the merging-section starting point 65 to the merging-section ending point 67 is the merging section 71. Lane change from the merge lane 59 into the merging target lane 61 is performed on the merging section 71.

In FIG. 5, the reference sign 69 is the reference position for merging. The reference position 69 is a predetermined (i.e., previously determined) position within the merging section 71. The reference position 69 may be the same position as the merging-section starting point 65, may be the same position as the merging-section ending point 67, or may be a position between the merging-section starting point 65 and the merging-section ending point 67.

A merging assistance operation performed by the merging assistance device 1 will be described with reference to FIGS. 3, 4, 6, and 7.

Figure 3:
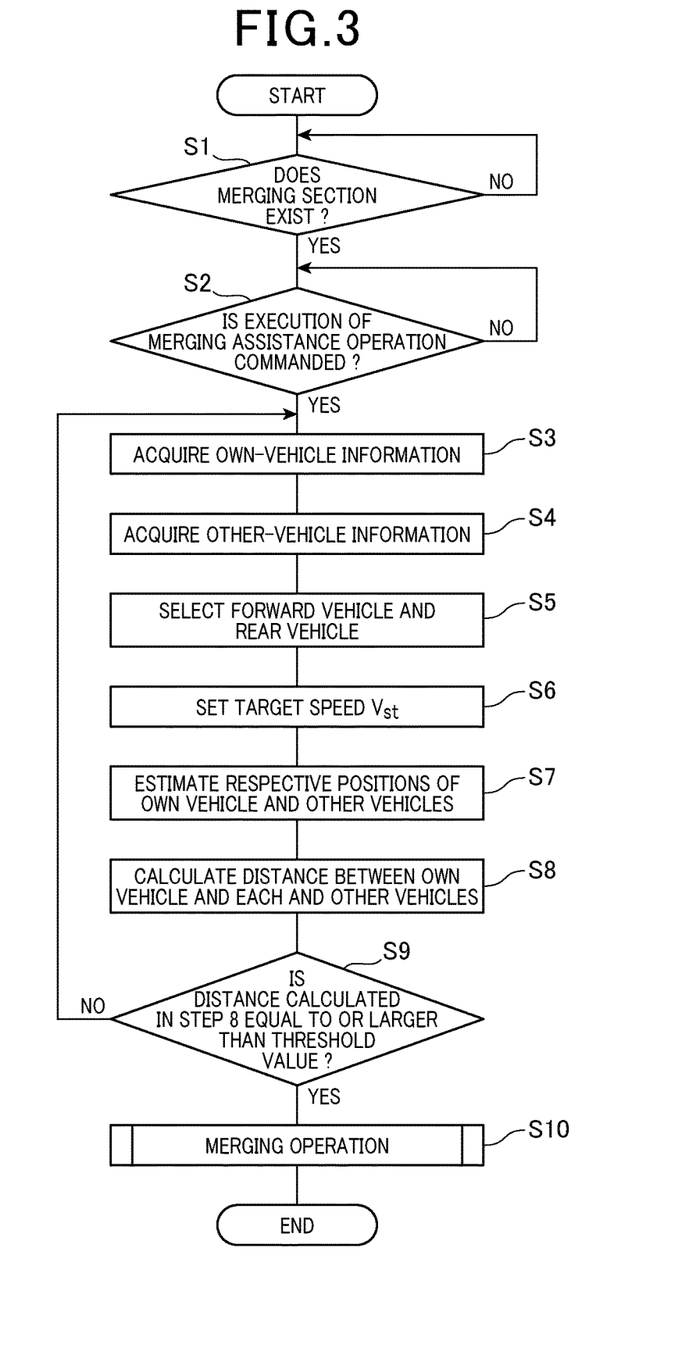
FIG. 3 is a flowchart illustrating a merging assistance operation performed by the merging assistance device.

In step S1 of FIG. 3, first, the processing determination unit 7 acquires the positional information of the own vehicle 57 by using the locator 37. Next, the processing determination unit 7 refers to the map information stored in the locator 37, and searches the area ahead of the own vehicle 57 for the merging section 71. When the merging section 71 is detected by this search, the processing determination unit 7 determines that the merging section 71 exists ahead of the own vehicle 57 and advances the processing to step S2. Conversely, when the merging section 71 has not been detected by the search, the processing determination unit 7 determines that the merging section 71 does not exist ahead of the own vehicle 57 and returns the processing to the phase prior to step S1.

In step S2, the processing determination unit 7 determines whether the merging assistance device 1 is in a condition where execution of a merging assistance operation is commanded or not. When a driver of the own vehicle 57 has operated the HMI system 45 to command execution of the merging assistance operation, the processing determination unit 7 determines that the merging assistance device 1 is in a condition where execution of the merging assistance operation is commanded, and advances the processing to step S3.

When a driver of the own vehicle 57 has not operated the HMI system 45 to command execution of the merging assistance operation, the processing determination unit 7 determines that the merging assistance device 1 is not in a condition where execution of the merging assistance operation is commanded, and returns the processing to the phase prior to step S2.

In step S3, the own-vehicle information acquisition unit 27 acquires own-vehicle information. The own-vehicle information includes the speed $v_{s0}$ of the own vehicle 57 at this time and the position $P_{s0}$ of the own vehicle 57 at this time. The own-vehicle information acquisition unit 27 acquires the speed $v_{s0}$ by using the wheel speed sensor 42. Additionally, the own-vehicle information acquisition unit 27 acquires the position $P_{s0}$ by using the locator 37. The speed $v_{s0}$ is speed of the own vehicle 57 in the merge lane 59 and/or the merging target lane 61 in its travelling direction. The position $P_{s0}$ is the position of the own vehicle 57 on the merge lane 59 or the merging target lane 61 in the travelling direction.

In step S4, the other-vehicle information acquisition unit 29 acquires other-vehicle information. This other-vehicle information includes the speed of another vehicle 63 traveling on the merging target lane 61 at this time and the position of another vehicle 63 at this time. The other-vehicle information acquisition unit 29 acquires the other-vehicle information by using the peripheral monitor 35. Additionally or alternatively, the other-vehicle information acquisition unit 29 may acquire the other-vehicle information by performing vehicle-to-vehicle communication with another vehicle 63 using the wireless communication system 49.

When plural other vehicles 63 exist, the other-vehicle information acquisition unit 29 acquires other-vehicle information of each of the other vehicles 63. The speed of another vehicle 63 means speed of another vehicle 63 on the merge lane 59 and/or the merging target lane 61 in the travelling direction. The position of another vehicle 63 means the position of another vehicle 63 on the merge lane 59 or the merging target lane 61 in the travelling direction.

In step S5, the processing determination unit 7 selects two other vehicles 63 from all the detected other vehicles 63 by using the other-vehicle information acquired in step S4 such that an inter-vehicular distance between the own can and each of the selected two other vehicles 63 becomes equal to or larger than a predetermined threshold value. In the following description, the vehicle ahead of the own car out of the two selected other vehicles 63 is referred to as the forward vehicle 63*f*, and the vehicle behind the own car out of the two selected other vehicles 63 is referred to as the rear vehicle 63*r*.

Out of the information items included in the other-vehicle information acquired in step S4, the speed of the forward vehicle 63*f* is defined as $v_f$, the position of the forward vehicle 63*f* is defined as $P_{f0}$, the speed of the rear vehicle 63*r* is defined as $v_r$, and the position of the rear vehicle 63*r* is defined as $P_{r0}$.

In step S6, the target-speed setting unit 23 sets target speed $v_{st}$ of the own vehicle 57 indicated by the following formula (1). The target speed $v_{st}$ is speed of the own vehicle 57 on the merge lane 59 and/or the merging target lane 61 in the traveling direction.

$$v_{st}=v_f+\alpha \qquad (1)$$

In the formula (1), $\alpha$ is a constant. This $\alpha$ may be a positive constant, zero, or a negative constant. When $\alpha$ is zero, $v_{st}$ becomes equal to $v_f$. The formula (1) corresponds to predetermined relationship between $v_{st}$ and $v_f$.

In step S7, the estimated-position calculator 31 estimates respective positions of the own vehicle 57, the forward vehicle 63*f*, and the rear vehicle 63*r* at the completion time of the merging assistance operation, under the following assumption. That is, the merging assistance operation is assumed to be performed on the own vehicle 57 from this point in time according to a predetermined speed control schedule. The estimated-position calculator 31 performs the above-described estimation processing based on the own-vehicle information acquired in step S3 and the other-vehicle information acquired in step S4.

The above-described speed control schedule consists of the first step and the second step as follows. In the first step, the own vehicle 57 is accelerated from the speed $v_{s0}$ to the target speed $v_{st}$ according to acceleration $a_0$ on the merge lane 59. In the second step, the own vehicle 57 is caused to change its travel lane from the merge lane 59 into the merging target lane 61 while keeping the target speed $v_{st}$.

The position $P_s$ of the own vehicle 57 at the completion time of the merging assistance operation is indicated by the following formula (2). The position $P_s$ is the position of the own vehicle 57 on the merge lane 59 or the merging target lane 61 in the travelling direction.

$$P_s = P_{s0}+\Delta x_{s1}+\Delta x_{s2} \qquad (2)$$
$$= P_{s0}+(v_{st}^2-v_{s0}^2)2a_0+v_{st}T_{ls}$$

In the formula (2), $\Delta x_{s1}$ is a traveling distance of the own vehicle 57 during the first step, and $\Delta x_{s2}$ is a traveling distance of the own vehicle 57 during the second step. In the formula (2), $T_{ls}$ is a time required for the own vehicle 57 to change its travel lane and is a predetermined constant.

Figure 6:
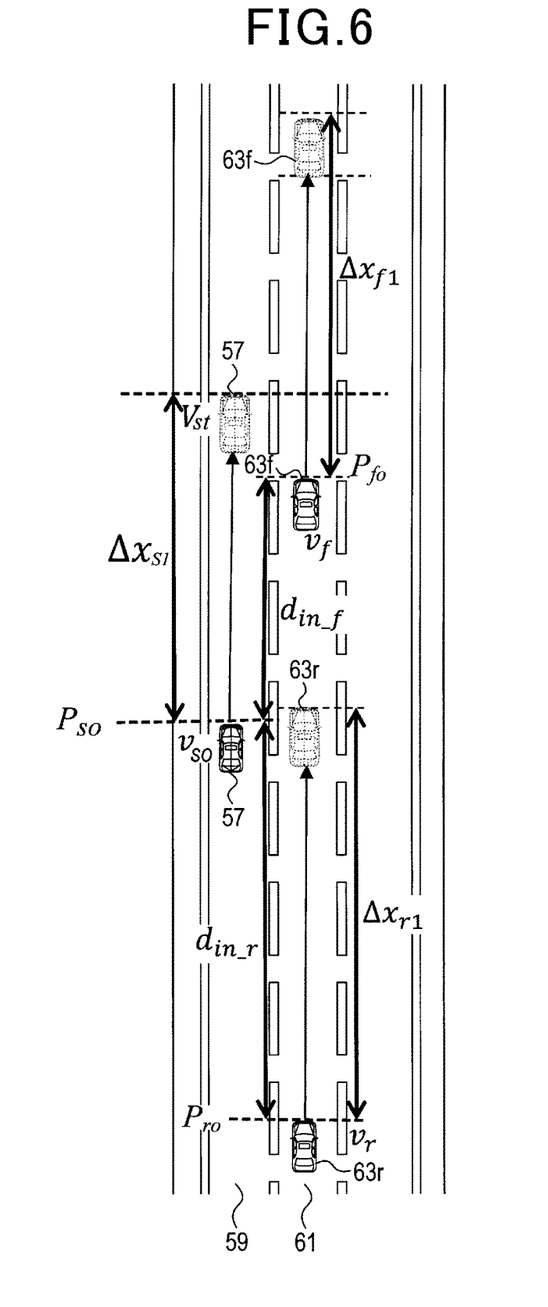
FIG. 6 is a schematic diagram illustrating positional relationships between an own vehicle, a forward vehicle, and a rear vehicle, when the own vehicle accelerates on the merge lane.
Figure 7:
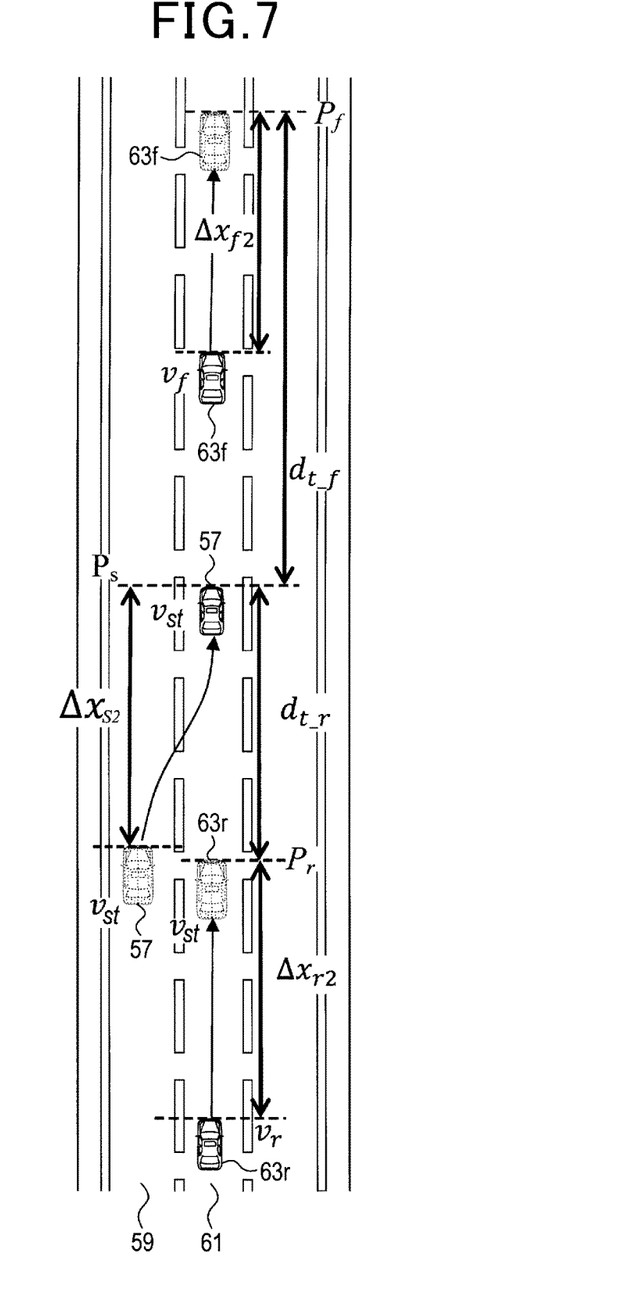
FIG. 7 is a schematic diagram illustrating positional relationships between the own vehicle, the forward vehicle, and the rear vehicle, when the own vehicle changes its travel lane from the merge lane to the merging target lane.

The position $P_f$ of the forward vehicle 63*f* at the completion time of the merging assistance operation is indicated by the following formula (3). The position $P_f$ is the position of the forward vehicle 63f on the merge lane 59 or the merging target lane 61 in the travelling direction.

$$P_f = P_{f0} + \Delta x_{f1} + \Delta x_{f2} \quad (3)$$

$$= P_{f0} + v_{f\{(v_{st}-v_{s0})/a_0\}_+} v_f T_{lc}$$

In the formula (3), $\Delta x_{f1}$ is a traveling distance of the forward vehicle 63f during the first step, and $\Delta x_{f2}$ is a traveling distance of the forward vehicle 63f during the second step.

The position $P_r$ of the rear vehicle 63r at the completion time of the merging assistance operation is indicated by the following formula (4). The position $P_r$ is the position of the rear vehicle 63r on the merge lane 59 and/or the merging target lane 61 in the travelling direction.

$$P_r = P_{r0} + \Delta x_{r1} + \Delta x_{r2} \quad (4)$$

$$= P_{r0} + v_{r\{(v_{st}-v_{s0})/a_0\}_+} ((v_r^2 - v_{st}^2) 2a_r$$

In the formula (4), $\Delta x_{r1}$ is a traveling distance of the rear vehicle 63r during the first step, and $\Delta x_{r2}$ is a traveling distance of the rear vehicle 63r during the second step. In the formula (4), $a_r$ is deceleration which can be expected of the rear vehicle 63r. The speed $v_r$ of the rear vehicle 63r during the second step may be treated as a constant value, and in such a case, $\Delta x_{r2}$ becomes a product of $v_r$ and $T_{ls}$.

In step S8, the inter-vehicular distance determination unit 33 calculates the distance $d_{t\_f}$ between the position $P_f$ and the position $P_s$. Additionally, in step S8, the inter-vehicular distance determination unit 33 calculates the distance $d_{t\_r}$ between the position $P_S$ and the position $P_r$. Each of the distance $d_{t\_f}$ and the distance $d_{t\_r}$ is an interval on the merge lane 59 and/or the merging target lane 61 in the travelling direction. The distance $d_{t\_f}$ is indicated by the following formula (5), and the distance $d_{t\_r}$ is indicated by the following formula (6).

$$d_{t\_f} = P_f - P_S \quad (5)$$

$$d_{t\_r} = P_s - P_r \quad (6)$$

In step S9, the inter-vehicular distance determination unit 33 determines whether the distance $d_{t\_f}$ calculated in step S8 is equal to or larger than a predetermined threshold value or not. This threshold value is a product of $v_{st}$ and $T_{hw\_f}$, where $T_{hw\_f}$ is a forward target inter-vehicle time and is a predetermined constant.

Also in this step S9, the inter-vehicular distance determination unit 33 determines whether the distance $d_{t\_r}$ calculated in step S8 is equal to or larger than a predetermined threshold value or not. This threshold value is a product of $v_{st}$ and $T_{hw\_r}$, where $T_{hw\_r}$ is a rear target inter-vehicle time and is a predetermined constant.

When the distance $d_{t\_f}$ is not smaller than the threshold value $v_{st}*T_{hw\_f}$ and the distance $d_{t\_r}$ is not smaller than the threshold value $V_{st}*T_{hw\_r}$, the processing proceeds to step S10. Otherwise, the processing returns to step S3.

In step 10, a merging operation is executed. This merging operation will be described with reference to FIG. 4.

Figure 4:
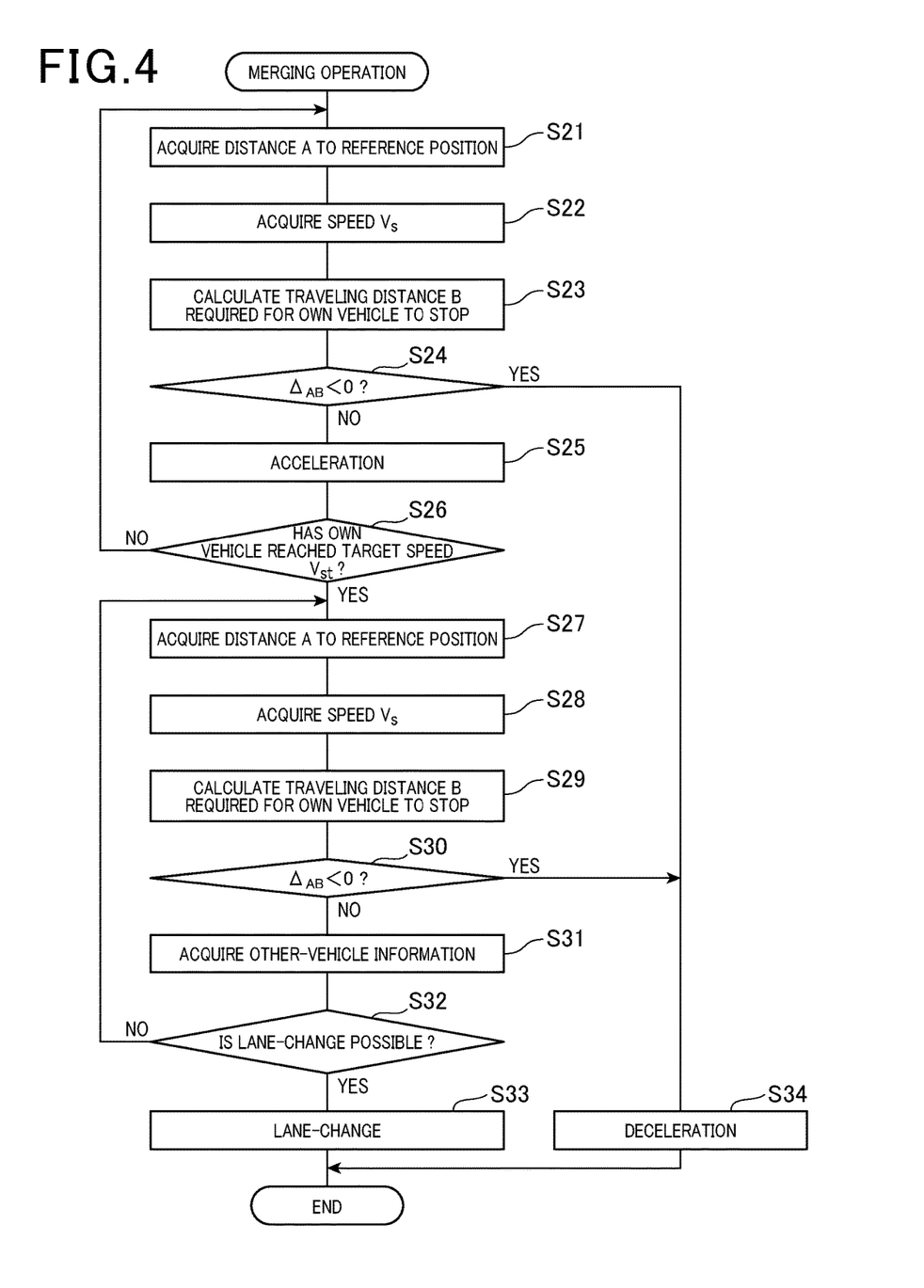
FIG. 4 is a flowchart illustrating a merging operation performed by the merging assistance device.

In step S21 of FIG. 4, the distance-A acquisition unit 13 acquires the position of the own vehicle 57 at this time by using the locator 37. Additionally, the distance-A acquisition unit 13 acquires the position of the reference position 69 by referring to the map information stored in the above-described memory device of the locator 37. Further, the distance-A acquisition unit 13 acquires the distance A from the position of the own vehicle 57 at this time to the reference position 69. The distance A is a distance on the merge lane 59 and/or the merging target lane 61 in the travelling direction.

In step S22, the own-vehicle information acquisition unit 27 acquires the speed $v_s$ of the own vehicle 57 at this time by using the wheel speed sensor 42.

In step S23, the traveling-distance-B calculator 17 calculates the traveling distance B from the current position of the own vehicle 57 traveling at the speed $v_s$ acquired in step S22 and decelerating at the predetermined deceleration b to the position where the own vehicle 57 stops. The deceleration b is acceleration having a negative value, and is constant from start of deceleration until the own vehicle 57 stops.

In step S24, the stop controller 19 determines whether the value obtained by subtracting the traveling distance B acquired in step S23 from the distance A acquired in step S21 (hereinafter, referred to as $\Delta_{AB}$) is smaller than zero or not. In this determination, zero is an example of the predetermined threshold value. When $\Delta_{AB}$ is equal to or larger than zero, the processing proceeds to step S25. When $\Delta_{AB}$ is smaller than zero, the processing proceeds to step S34.

In step S25, the accelerator 9 accelerates the own vehicle 57 at acceleration $a_0$ so as to increase the speed of the own vehicle 57 by $\Delta v$ which is a positive value.

In step S26, the accelerator 9 determines whether the speed of the own vehicle 57 has reached the target speed $v_{st}$ set in step S6 or not. When the speed of the own vehicle 57 has reached the target speed $v_{st}$, the processing proceeds to step S27. When the speed of the own vehicle 57 has not reached the target speed $v_{st}$, the processing returns to step S21.

In step S27, the distance-A acquisition unit 13 acquires the distance A between the position of the own vehicle 57 at this time and the reference position 69 in a manner similar to step S21.

In step S28, the own-vehicle information acquisition unit 27 acquires the speed $v_s$ of the own vehicle 57 at this time in a manner similar to step S22. The speed $v_s$ acquired in this step S28 is supposed to be equal or close to the target speed $v_{st}$.

In step S29, the traveling-distance-B calculator 17 calculates the traveling distance B in a manner similar to step S23.

In step S30, the stop controller 19 calculates $\Delta_{AB}$ by subtracting the traveling distance B calculated in step S29 from the distance A calculated in step S27 in a manner similar to step S24. Then, the stop controller 19 determines whether the calculated $\Delta_{AB}$ is smaller than zero or not. When $\Delta_{AB}$ is equal to or larger than zero, the processing proceeds to step S31. When $\Delta_{AB}$ is smaller than zero, the processing proceeds to step S34.

In step S31, the other-vehicle information acquisition unit 29 acquires the other-vehicle information in a manner similar to step S4.

In step S32, the lane-change controller 11 determines whether the own vehicle 57 can merge into the merging target lane 61 from the merge lane 59 or not, by using the other-vehicle information acquired in step S31. In other words, the lane-change controller 11 determines presence/absence of another vehicle 63 potentially colliding with the own vehicle 57 when the own vehicle 57 change its travel lane from the merge lane 59 into the merging target lane 61, by using the other-vehicle information acquired in step S31.

When lane change is possible, the processing proceeds to step S33. When lane change is impossible, the processing returns to step S27.

In step S33, the lane-change controller 11 causes the own vehicle 57 to change its travel lane from the merge lane 59 to the merging target lane 61 by using the steering controller 43.

Incidentally, when the determination result in step S24 or S30 is affirmative, the processing proceeds to step S34 directly from step S24 or S30 omitting at least steps S31 to S33.

In step S34, the decelerator 21 decelerates the own vehicle 57, which corresponds to stopping the merging assistance operation.

<Effects of Merging Assistance Device>

The merging assistance device 1 stops the merging assistance operation on condition that $\Delta_{AB}$ is smaller than zero during a period between a start time of acceleration for merging and a start time of lane change.

Thus, even if the own vehicle 57 is put into a situation where the own vehicle 57 should not merge into the merging target lane 61 due to a certain reason after starting acceleration for merging, the merging assistance operation can be stopped before the own vehicle 57 gets excessively close to the reference point 69. As a result, safety of the own vehicle 57 can be enhanced.

When the merging assistance device 1 stops the merging assistance operation, the merging assistance device 1 decelerates the own vehicle 57. Accordingly, safety of the own vehicle 57 is further enhanced.

The merging assistance device 1 sets the target speed $v_{st}$ of the own vehicle 57 such that predetermined relationship between the target speed $v_{st}$ and the speed $v_f$ of the forward vehicle is satisfied like the formula (1). This relationship simplifies the processing of setting the target speed $v_{st}$, and makes it easier to increase the distance $d_{t\_f}$ and the distance $d_{t\_r}$.

The merging assistance device 1 estimates the position $P_s$ of the own vehicle 57 at the time when merging is completed according to the speed control schedule being set in advance, by using the own-vehicle information. Additionally, the merging assistance device 1 estimates the position $P_f$ of the forward vehicle 63f and the position $P_r$ of the rear vehicle 63r at the time when the own vehicle 57 completes merging according to the above speed control schedule, by using the other-vehicle information. Further, the merging assistance device 1 calculates the distance $d_{t\_f}$ and the distance $d_{t\_r}$ from the position $P_s$, the position $P_f$, and position $P_r$.

Moreover, the merging assistance device 1 starts acceleration for merging, on condition that the distance $d_{t\_f}$ is not smaller than the threshold value $v_{st}*T_{hw\_f}$ and the distance $d_{t\_r}$ is not smaller than the threshold value $v_{st}*T_{hw\_r}$. Accordingly, the timing of starting acceleration of the own vehicle 57 can be appropriately set.

The merging assistance device 1 can acquire other-vehicle information by using the peripheral monitor 35. Thus, even if another vehicle 63 is not equipped with a function of performing vehicle-to-vehicle communication or even if the own vehicle 57 is put into a situation where vehicle-to-vehicle communication is unavailable, the merging assistance device 1 can easily acquire other-vehicle information.

The merging assistance device 1 can acquire other-vehicle information by using vehicle-to-vehicle communication between the own vehicle 57 and another vehicle 63. Thus, even if another vehicle 63 exists outside the detection range of the peripheral monitor 35, the merging assistance device 1 can easily acquire other-vehicle information.

Other Embodiments

While certain embodiments of the present invention have been described, these embodiments have been presented by way of example only, and are not intended to limit the scope of the present invention. The novel methods and systems of the present invention may be embodied in a variety of other forms.

The target speed $v_{st}$ may be set as a value which is independent of speed of another vehicle 63. For instance, the target speed $v_{st}$ may be set on the basis of legally defined parameters such as legal speed limit of the merging target lane 61.

The merging assistance device 1 may decelerate the own vehicle 57 and leave the driving of the own vehicle 57 to the driver in step S34. Additionally or alternatively, the merging assistance device 1 may leave the driving of the own vehicle 57 to the driver in step S34 instead of decelerating the own vehicle 57.

In step S24 and step S30, the stop controller 19 may determine whether $\Delta_{AB}$ is smaller than a non-zero threshold value K or not. The threshold value K may be a positive value or a negative value.

The acceleration $a_0$ may not be constant. For instance, the acceleration $a_0$ may be changed according to the speed and the position of the own vehicle 57.

As to selection of the forward vehicle 63f and the rear vehicle 63r in step S5, the following processing may be performed after selecting the forward vehicle 63f and the rear vehicle 63r as needed. That is, the processing of steps S21 to S24 may be performed in step S5, when this selection processing takes a time equal to or smaller than a threshold value determined in advance for this selection processing. In this case, when $\Delta_{AB}$ is determined to be smaller than zero in the processing of step S24 as the result, the merging assistance operation can be stopped. Also in this case, when $\Delta_{AB}$ is determined to be larger than zero, the processing of step S5 can be continued.

Figure 8:
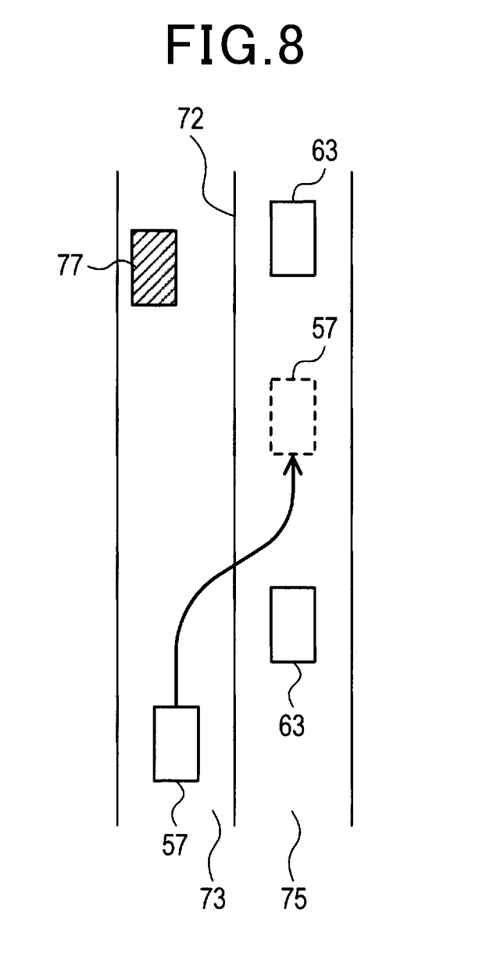
FIG. 8 is a schematic diagram illustrating a case where the own vehicle merges into the second lane from the first lane.

The merging assistance device 1 may be configured to assist the own vehicle 57 in merging into the second lane 75 from the first lane 73 when one road is separated into the first lane 73 and the second lane 75 by the demarcation line 72 as shown in FIG. 8. In this case, the reference position 69 is, e.g., the position of the stopped vehicle 77 stopping on the first lane 73 or a position separated from the stopped vehicle 77 by a predetermined distance.

Plural functions implemented by one component in the above-described embodiments may be implemented by plural components, and one function implemented by one component in the above-described embodiments may be implemented by plural components. Additionally, plural functions implemented by plural components in the above-described embodiments may be implemented by one component, and one function implemented by plural components in the above-described embodiments may be implemented by one component. Further, a part of the configuration of each of the above-described embodiments may be omitted. Moreover, at least a part of the configuration of one of the above-described embodiments may be added to the configuration of another of the above-described embodiments. Similarly, a part of the configuration of one of the above-described embodiments may be replaced by at least a part of the configuration of another of the above-described embodiments. Any aspects included in the technological ideas specified by the terms in the claims belong to embodiments of the present invention.

Aside from the above-described merging assistance device 1, the present invention can be embodied in various forms such as a system equipped with this merging assistance device 1, a program which causes a computer to work like the merging assistance device 1, a non-transitional substantive memory medium storing such a program, such an assistance method in merging, and such a control method.

What is claimed is:

1. A merging assistance device, comprising:
   an accelerator configured to accelerate a own vehicle to a target speed on a first lane;
   a lane-change controller configured to cause the own vehicle accelerated to the target speed to change a travel lane from the first lane into a second lane;
   a distance-A acquisition unit configured to acquire a distance A from the own vehicle to a reference position in the first lane;
   an own-vehicle speed acquisition unit configured to acquire a speed of the own vehicle;
   a traveling-distance-B calculator configured to calculate a traveling distance B required for the own vehicle to stop under a condition where the own vehicle traveling at the speed acquired by the own-vehicle speed acquisition unit starts to slow down at a predetermined deceleration; and
   a stop controller configured to stop an operation of assisting in merging, on condition that a value obtained by subtracting the distance B calculated by the traveling-distance-B calculator from the distance A acquired by the distance-A acquisition unit is smaller than a predetermined threshold value during a period from a start time of the acceleration controlled by the accelerator to a start time of changing the travel lane controlled by the lane-change controller.

2. The merging assistance device according to claim 1, further comprising a decelerator configured to decelerate the own vehicle when the stop controller stops the operation of assisting in merging.

3. The merging assistance device according to claim 2, further comprising:
   an other-vehicle speed acquisition unit configured to acquire speed of another vehicle traveling on the second lane; and
   a target-speed setting unit configured to set the target speed in such a manner that predetermined relationship between the target speed and the speed of another vehicle acquired by the other-vehicle speed acquisition unit is satisfied.

4. The merging assistance device according to claim 3, further comprising:
   an own-vehicle information acquisition unit configured to acquire own-vehicle information in which a position and speed of the own vehicle traveling on the first lane are included;
   an other-vehicle information acquisition unit configured to acquire other-vehicle information in which a position and speed of another vehicle traveling on the second lane are included;
   an estimated-position calculator configured to estimate a position of the own vehicle and a position of the another vehicle at a time when the own vehicle completes merging into the second lane according to a predetermined speed control schedule, by using the own-vehicle information and the other-vehicle information; and
   an inter-vehicular distance determination unit configured to determine whether a distance between the position of the own vehicle and the position of the another vehicle estimated by the estimated-position calculator is equal to or larger than a predetermined threshold value or not,
   wherein the accelerator is configured to start accelerating the own vehicle, on condition that the distance between the position of the own vehicle and the position of the another vehicle is determined to be equal to or larger than the predetermined threshold value by the inter-vehicular distance determination unit.

5. The merging assistance device according to claim 4, wherein the other-vehicle information acquisition unit is configured to acquire the other-vehicle information by using at least one sensor installed in the own vehicle.

6. The merging assistance device according to claim 4, wherein the other-vehicle information acquisition unit is configured to acquire the other-vehicle information by using vehicle-to-vehicle communication between the own vehicle and the another vehicle.

7. The merging assistance device according to claim 1, further comprising:
   an other-vehicle speed acquisition unit configured to acquire speed of another vehicle traveling on the second lane; and
   a target-speed setting unit configured to set the target speed in such a manner that predetermined relationship between the target speed and the speed of another vehicle acquired by the other-vehicle speed acquisition unit is satisfied.

8. The merging assistance device according to claim 7, further comprising:
   an own-vehicle information acquisition unit configured to acquire own-vehicle information in which a position and speed of the own vehicle traveling on the first lane are included;
   an other-vehicle information acquisition unit configured to acquire other-vehicle information in which a position and speed of another vehicle traveling on the second lane are included;
   an estimated-position calculator configured to estimate a position of the own vehicle and a position of the another vehicle at a time when the own vehicle completes merging into the second lane according to a predetermined speed control schedule, by using the own-vehicle information and the other-vehicle information; and
   an inter-vehicular distance determination unit configured to determine whether a distance between the position of the own vehicle and the position of the another vehicle estimated by the estimated-position calculator is equal to or larger than a predetermined threshold value or not,
   wherein the accelerator is configured to start accelerating the own vehicle, on condition that the distance between the position of the own vehicle and the position of the another vehicle is determined to be equal to or larger than the predetermined threshold value by the inter-vehicular distance determination unit.

9. The merging assistance device according to claim 8, wherein the other-vehicle information acquisition unit is configured to acquire the other-vehicle information by using at least one sensor installed in the own vehicle.

10. The merging assistance device according to claim 8, wherein the other-vehicle information acquisition unit is configured to acquire the other-vehicle information by using vehicle-to-vehicle communication between the own vehicle and the another vehicle.

11. The merging assistance device according to claim 1, further comprising:
   an own-vehicle information acquisition unit configured to acquire own-vehicle information in which a position and speed of the own vehicle traveling on the first lane are included;
   an other-vehicle information acquisition unit configured to acquire other-vehicle information in which a position and speed of another vehicle traveling on the second lane are included;
   an estimated-position calculator configured to estimate a position of the own vehicle and a position of the another vehicle at a time when the own vehicle completes merging into the second lane according to a predetermined speed control schedule, by using the own-vehicle information and the other-vehicle information; and
   an inter-vehicular distance determination unit configured to determine whether a distance between the position of the own vehicle and the position of the another vehicle estimated by the estimated-position calculator is equal to or larger than a predetermined threshold value or not,
   wherein the accelerator is configured to start accelerating the own vehicle, on condition that the distance between the position of the own vehicle and the position of the another vehicle is determined to be equal to or larger than the predetermined threshold value by the inter-vehicular distance determination unit.

12. The merging assistance device according to claim 11, wherein the other-vehicle information acquisition unit is configured to acquire the other-vehicle information by using at least one sensor installed in the own vehicle.

13. The merging assistance device according to claim 11, wherein the other-vehicle information acquisition unit is configured to acquire the other-vehicle information by using vehicle-to-vehicle communication between the own vehicle and the another vehicle.

14. A method of assisting merging vehicles, comprising steps of:
   accelerating a own vehicle to target speed on a first lane;
   causing the own vehicle accelerated to the target speed to change a travel lane from the first lane into a second lane;
   acquiring a distance A from the own vehicle to a reference position in the first lane;
   acquiring speed of the own vehicle;
   calculating a traveling distance B required for the own vehicle to stop under a condition where the own vehicle traveling at acquired speed starts to slow down at predetermined deceleration; and
   assisting in merging, on condition that a value obtained by subtracting the calculated distance B from the acquired distance A is smaller than a predetermined threshold value during a period from a start time of the acceleration to a start time of changing the travel lane.

* * * * *